United States Patent

Naito et al.

Patent Number: 5,958,291
Date of Patent: Sep. 28, 1999

[54] LIQUID CRYSTAL DISPLAY ELEMENT

[75] Inventors: Katsuyuki Naito, Tokyo; Hiroki Iwanaga, Yokohama, both of Japan

[73] Assignee: Kabushiki Kaisha Toshiba, Kawasaki, Japan

[21] Appl. No.: 08/917,833

[22] Filed: Aug. 27, 1997

[30] Foreign Application Priority Data

Aug. 29, 1996 [JP] Japan .................................. 8-228262

[51] Int. Cl.$^6$ .......................... C09K 19/00; C09K 19/60; G02F 1/1347
[52] U.S. Cl. ................... 252/299.1; 252/299.01; 349/74; 349/79; 349/86; 349/165
[58] Field of Search ............... 252/299.01, 299.1; 428/1; 349/165, 74, 77, 79, 86, 110; 345/88

[56] References Cited

U.S. PATENT DOCUMENTS

| | | | |
|---|---|---|---|
| 4,689,171 | 8/1987 | Blunck et al. | 252/299.1 |
| 5,790,215 | 8/1998 | Sugahara et al. | 349/74 |

FOREIGN PATENT DOCUMENTS

| | | |
|---|---|---|
| 56-35168 | 4/1981 | Japan . |
| 62-101658 | 5/1987 | Japan . |
| 2-178390 | 7/1990 | Japan . |
| 3-137164 | 6/1991 | Japan . |
| 5-2194 | 1/1993 | Japan . |
| 6-234976 | 8/1994 | Japan . |
| 7-252495 | 9/1995 | Japan . |
| 7-319110 | 12/1995 | Japan . |
| 8-006108 | 7/1997 | Japan . |

*Primary Examiner*—Shean C. Wu
*Attorney, Agent, or Firm*—Finnegan, Henderson, Farabow, Garrett & Dunner, L.L.P.

[57] ABSTRACT

This liquid crystal display element is featured in that it comprises, a substrate provided on one main surface thereof with an electrode, a 3-ply GH liquid crystal layer superimposed on the substrate, each GH liquid crystal layer being different in absorption wavelength from each other and containing a host liquid crystal and a guest dichroic dye, and three transparent electrode layers, each formed on each of the GH liquid crystal layer, wherein at least one layer out of the 3-ply GH liquid crystal layer contains a fluorine-based liquid crystal and an anthraquinone-based magenta or cyan dichroic dye having at least two arylthio groups.

17 Claims, 2 Drawing Sheets

LIQUID CRYSTAL DISPLAY ELEMENT

BACKGROUND OF THE INVENTION

This invention relates to a liquid crystal display element, and in particular to a reflective type liquid crystal display element of guest-host mode.

There have been proposed various kinds of liquid crystal display element as a display element for use in a display for information processor. Among them, a liquid crystal display element employing a nematic liquid crystal represented by TN (twisted nematic) mode (for example, Japanese Patent Unexamined Publication S/47-11737) and STN (super twisted nematic) mode (for example, Japanese Patent Unexamined Publication S/60-107020) is extensively utilized at present.

In the case of TN mode or STN mode, the alignment of liquid crystal molecules is constituted by a twisted structure where the alignment of liquid crystal molecules is twisted in the element by about 90° or 260° in the initial state. In this case, the light that has entered into the element is radiated therefrom accompanying a change in polarization that has been induced as it passes through the liquid crystal layer by the twisted alignment of the liquid crystal molecules and also by birefringence thereof. On the other hand, when a voltage is impressed on the liquid crystal layer, the liquid crystal molecules are realigned in the direction of electric field so that the twisted structure thereof is released and the birefringence is no more generated, and hence the incident light can be radiated therefrom without accompanying a change in polarization. Therefore, when a liquid cell is sandwiched between a pair of linear polarizers, this change in optical characteristics of liquid crystal layer which depends upon the application of voltage can be observed as a change in intensity of light. Both TN mode and STN mode are actuated, based on this operational principle, to obtain a contrast of image.

The liquid crystal display of this display mode is advantageous over the CRT (cathode ray tube) display in that the power consumption is very small as compared with the CRT display and that it can be easily fabricated into a thin display panel. Due to these advantages, the liquid crystal display is widely utilized in various kinds of information processors for business use such as a personal computer and a word processor.

However, there is a problem in the aforementioned display employing polarizers in that the incident light is not effectively utilized yet. Therefore as a matter of fact, for the purpose of achieving a sufficient display brightness, most of the display of this kind is provided with a light source (backlight) which is disposed behind the liquid display element. In particular, in the case of display provided with a color filter, a relatively strong light source is required, since the light that can be transmitted to the liquid crystal will be further reduced due to the color filter.

However, since the power required for this light source is almost equal to the power consumption required for liquid crystal display element (including the driving circuit thereof), the liquid crystal display element provided with a backlight is not suited for use in a potable information apparatus where the electric power therefor is supplied by a battery. Namely, according to the conventional display mode, the relationship between the improvement on the brightness and the saving of power consumption can be likened to that of the trade-off. Moreover, the display provided with a backlight is not preferable in the respect that the backlight would lead to the fatigue of one's eyes when one continues to watch the display. Therefore, the development of a reflective type display excellent in brightness without necessitating a backlight has been strongly demanded. In the case of projection type display also, a display mode of high light transmittance has been demanded in view of realizing the miniaturization, long life and power saving of the device. To meet such a demand, a liquid crystal display mode not provided with polarizers has been proposed.

As one example of this display mode, a display mode to be employed in a White-Taylor type guest-host (GH) element is known (J. Appl. Phys., Vol. 45, pp. 4718–4723, 1974).

In the display mode, a mixture comprising a liquid crystal exhibiting a chiral smectic phase and a dichroic dye is employed in a liquid crystal layer, and the molecules of the dichroic dye are aligned parallel with the surface of substrate in the initial state. When a voltage is impressed, the array of the molecules of the dichroic dye changes with a change in array of the liquid crystal molecules, thus causing a change in light transmittance. Since the twist structure is designed to be induced by the chiral nematic phase in this display mode, the light absorption by the dye can be effectively brought about, thus theoretically making it possible to obtain a high display contrast without employing the polarizers.

However, if a high display contrast is to be attained in this display mode, the helical pitch of the chiral nematic phase is required to be made equivalent to the order of wavelength of light. However, if the helical pitch is shortened to such a degree, a large number of discrimination lines would be generated thereby damaging the quality of display and at the same time a phenomenon of hysteresis would be generated, and hence the response to an electric field would become extremely slow. Accordingly, it would be difficult to put this display mode into practical use as compared with the aforementioned TN mode and STN mode.

Another typical example of display mode which is not provided with polarizers is a display mode called PDLC (Polymer Dispersed Liquid Crystal) (Japanese Patent Unexamined Publication S/58-501631). In this display mode, a nematic liquid crystal having a positive dielectric anisotropy is dispersed as particles, each having a diameter of several micrometers, in a polymer matrix. This liquid crystal is selected such that the refractive index of this liquid crystal to the normal light is almost equivalent to that of the polymer matrix material, while the refractive index of this liquid crystal to an abnormal light differs substantially from that of the polymer matrix material.

In the PDLC, the granulated liquid crystal takes a distorted alignment structure in the initial state, and the alignment direction of the liquid crystal differs in each particle. As a result, a difference in refractive index between the majority of the liquid crystal particles and the polymer matrix is caused to generate, and hence the incident light is scattered as if it is scattered by a frosted glass.

When a sufficient voltage is applied to such a liquid crystal layer, the liquid crystal molecules are realigned, so that the refractive index of the liquid crystal molecules with regard to the light entering parallel with the direction of the electric field into the liquid crystal layer becomes identical with the refractive index of the polymer matrix. As a result, the refraction and reflection at the interface between the liquid crystal molecules and the high molecules are faded out, and hence the liquid crystal is turned transparent. In this case, the incident light is not required to be a linear light.

Since the display is actuated based on this operational principle, polarizers are not required in the PDLC.

Moreover, since the incident light is effectively utilized in this mode, a bright display can be obtained. However, if a sufficient display contrast is to be achieved in the PDLC, the liquid crystal layer is required to be formed into a film thickness of several tens micrometers, thus necessitating a driving voltage higher than 10V. Furthermore, since the PDLC is of a scattering type, it is not suited for use in a direct-vision display, which is usually employed in an OA machine, though it is suited for use for a projection type display.

A reflective type display wherein a dichroic dye is mixed in a nematic liquid crystal and at the same time a reflective body or the structure of liquid crystal is contrived in a suitable manner has been proposed (Japanese Patent Unexamined Publications S/59-178429; and S/59-178428). However, the above-mentioned problems are not essentially solved by any of these devices.

It is known that the reflective type liquid crystal display apparatus is capable of displaying a full color if a yellow GH liquid crystal layer, a magenta GH liquid crystal layer and a cyan GH liquid crystal layer are superimposed one upon another to form a 3-ply layer structure (Japanese Patent Unexamined Publications S/56-35168). As a matter of fact, the present inventors have also proposed a reflective type liquid crystal display apparatus which is bright and free from color variation, wherein a yellow GH liquid crystal layer, a magenta GH liquid crystal layer and a cyan GH liquid crystal layer each being formed with GH liquid crystal microcapsules are superimposed into a 3-ply layer structure without interposing a glass substrate therebetween, and TFT elements for driving the device are put together on a single substrate to enhance the aperture ratio (Japanese Patent Unexamined Publications H/7-56086). On the other hand, a reflective type liquid crystal display element wherein each GH liquid crystal layer is partitioned into microspaces and the color regions are respectively arranged horizontally is also known (for example, Japanese Patent Unexamined Publications S/53-81251).

The GH liquid crystal to be employed in these liquid crystal display elements is required to be excellent in light resistance. In order to meet this requirement, an anthraquinone-based dye has been employed as a dye for the GH liquid crystal. However, the anthraquinone-based dye is accompanied with a problem that the dichroic ratio thereof is generally low as compared with an azo-based dye. Meanwhile, there is known another type of GH liquid crystal wherein an anthraquinone-based dye having at least two arylthio groups and being excellent in dichroic ratio and in light resistance is dissolved in a cyano-based liquid crystal (Japanese Patent No. 1611442). This GH liquid crystal comprising an arylthio-substituted anthraquinone-based dye which is dissolved in a cyano-based liquid crystal may be employed in the aforementioned liquid crystal display element formed of a 3-ply structure comprising GH liquid crystals of yellow, magenta and cyan colors. However, it has been found difficult even in such a liquid crystal display element to obtain a sufficient display contrast due to a narrow absorption spectrum width, though the color tone thereof is excellent.

BRIEF SUMMARY OF THE INVENTION

Accordingly, an object of the present invention is to provide a liquid crystal display element which is suited for use in a reflective type color display and capable of concurrently realizing an excellent color tone and high display contrast.

Namely, according to the present invention, there is provided a liquid crystal display element which comprises; a substrate provided on one main surface thereof with an electrode; a 3-ply GH liquid crystal layer superimposed on the substrate, each GH liquid crystal layer being different in absorption wavelength from each other and containing a host liquid crystal and a guest dichroic dye; and three transparent electrode layers, each formed on each of the GH liquid crystal layer; wherein at least one layer out of the 3-ply GH liquid crystal layer contains a fluorine-based liquid crystal and an anthraquinone-based magenta or cyan dichroic dye having at least two arylthio groups.

According to the present invention, there is further provided a liquid crystal display element which comprises; a substrate provided on one main surface thereof with an electrode; a 3-ply GH liquid crystal layer superimposed on the substrate, each GH liquid crystal layer being different in absorption wavelength from each other and containing GH liquid crystal microcapsules containing a host liquid crystal and a guest dichroic dye; and three transparent electrode layers, each formed on each of the GH liquid crystal layer; wherein the GH liquid crystal microcapsules incorporated into at least one layer out of the 3-ply GH liquid crystal layer contains a fluorine-based liquid crystal and an anthraquinone-based magenta or cyan dichroic dye having at least two arylthio groups.

According to the present invention, there is further provided a liquid crystal display element which comprises; a substrate provided on one main surface thereof with an electrode; three GH liquid crystal layers juxtaposed on the substrate, each GH liquid crystal layer being different in absorption wavelength from each other and containing GH liquid crystal microcapsules containing a host liquid crystal and a guest dichroic dye; and a transparent electrode layer formed on the GH liquid crystal layers; wherein the GH liquid crystal microcapsules incorporated into at least one layer out of the GH liquid crystal layers contains a fluorine-based liquid crystal and an anthraquinone-based magenta or cyan dichroic dye having at least two arylthio groups.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The liquid crystal display element according to this invention will be further explained in detail as follows.

Conventionally, there has been known a liquid crystal display element which employs a GH liquid crystal comprising an anthraquinone-based dye having at least two arylthio groups, and a cyano-based liquid crystal. However, this conventional liquid crystal display element is accompanied with the problem that the quantity of light that can be absorbed by the liquid crystal is insufficient due to a narrow half band width of the absorption spectrum of the GH liquid crystal, thus failing to obtain a high display contrast. This problem may be a matter of no importance in the case of a yellow GH liquid crystal since the yellow GH liquid crystal is relatively low in visibility. However, this problem is serious in the cases of a cyan or magenta GH liquid crystal layer, in particular in the case of magenta GH liquid crystal layer, since these GH liquid crystals are relatively high in visibility. Therefore, there has been a strong demand to enhance the contrast ratio of cyan and magenta GH liquid crystals.

According to the liquid crystal display element of this intention, a GH liquid crystal containing a fluorine-based liquid crystal and an anthraquinone-based magenta or cyan dichroic dye having at least two arylthio groups is employed. The half band width of the absorption spectrum of this GH liquid crystal is larger than that of the conventional GH liquid crystal. This large half band width of the absorption spectrum of GH liquid crystal gives little influence to the color tone. Therefore, it is possible according to the liquid crystal display element of this invention to realize a sufficient display contrast while keeping an excellent color tone.

The half band width of the absorption spectrum of a fluorine-based liquid crystal containing an anthraquinone-based dye is determined by the interaction between the dye and the liquid crystal. However, the reason for this extended half band width that can be attained when a fluorine-based liquid crystal is employed is not yet clarified. However, it is assumed that the degree of freedom in conformation of anthraquinone-based dye molecule is increased by the employment of a fluorine-based liquid crystal as compared with a cyano-based liquid crystal.

As explained above, this invention is featured in the employment of a fluorine-based liquid crystal containing an anthraquinone-based magenta or cyan dichroic dye having at least two arylthio groups in a cyan or magenta GH liquid crystal layer. In this case, the aforementioned at least two arylthio groups should preferably be attached to any of the positions 1, 4, 5 and 8 of the anthraquinone-based dichroic dye.

In this case, if other positions that have been left unsubstituted by the arylthio groups out of the positions 1, 4, 5 and 8 are substituted by hydrogen atom, hydroxyl group, alkylamino group or arylamino group, the color tone can be controlled so that the colors of yellow, magenta and cyan can be respectively realized. Namely, if dichroic dyes represented by the following general formulas (1) to (3); (4) to (7); and (8) to (10) are employed, the colors of yellow, magenta and cyan can be respectively realized.

(1)

wherein $R_1$, $R_2$, X and Y represent hydrogen atom, a halogen atom, a substituted or unsubstituted alkyl group or a substituted or unsubstituted aryl group; n and m respectively represents an integer of 0 to 5; x and y respectively represents an integer of 0 to 3; and $R_1$, $R_2$, X and Y may be the same or different from each other if n, m, x and y are 2 or more.

(2)

wherein $R_1$, $R_2$, X and Y represent hydrogen atom, a halogen atom, a substituted or unsubstituted alkyl group or a substituted or unsubstituted aryl group; n and m respectively represents an integer of 0 to 5; x is an integer of 0 to 2; y is an integer of 0 to 4; and $R_1$, $R_2$, X and Y may be the same or different from each other if n, m, x and y are 2 or more.

(3)

wherein $R_1$, $R_2$, X and Y represent hydrogen atom, a halogen atom, a substituted or unsubstituted alkyl group or a substituted or unsubstituted aryl group; n and m respectively represents an integer of 0 to 5; x and y respectively represents an integer of 0 to 3; and $R_1$, $R_2$, X and Y may be the same or different from each other if n, m, x and y are 2 or more.

(4)

wherein $R_1$, $R_2$, X and Y represent hydrogen atom, a halogen atom, a substituted or unsubstituted alkyl group or a substituted or unsubstituted aryl group; n and m respectively represents an integer of 0 to 5; x and y respectively represents an integer of 0 to 2; and $R_1$, $R_2$, X and Y may be the same or different from each other if n, m, x and y are 2 or more.

(5)

wherein $R_1$, $R_2$, X and Y represent hydrogen atom, a halogen atom, a substituted or unsubstituted alkyl group or a substituted or unsubstituted aryl group; n and m respectively represents an integer of 0 to 5; x and y respectively represents an integer of 0 to 2; and $R_1$, $R_2$, X and Y may be the same or different from each other if n, m, x and y are 2 or more.

(6)

wherein $R_1$, $R_2$, X and Y represent hydrogen atom, a halogen atom, a substituted or unsubstituted alkyl group or a substituted or unsubstituted aryl group; n and m respectively represents an integer of 0 to 5; x and y respectively represents an integer of 0 to 2; and $R_1$, $R_2$, X and Y may be the same or different from each other if n, m, x and y are 2 or more.

(7)

wherein $R_1$, $R_2$, $R_3$, $R_4$, X and Y represent hydrogen atom, a halogen atom, a substituted or unsubstituted alkyl group or a substituted or unsubstituted aryl group; n and m respectively represents an integer of 0 to 5; x and y respectively represents an integer of 0 to 2; and $R_1$, $R_2$, $R_3$, $R_4$, X and Y may be the same or different from each other if n, m, x and y are 2 or more.

(8)

wherein $R_1$, $R_2$, X and Y represent hydrogen atom, a halogen atom, a substituted or unsubstituted alkyl group or a substituted or unsubstituted aryl group; $R_3$ and $R_4$ represent hydrogen atom, a substituted or unsubstituted alkyl group or a substituted or unsubstituted aryl group; n and m respectively represents an integer of 0 to 5; x and y respectively represents an integer of 0 to 2; and $R_1$, $R_2$, X and Y may be the same or different from each other if n, m, x and y are 2 or more.

(9)

wherein $R_1$, $R_2$, X and Y represent hydrogen atom, a halogen atom, a substituted or unsubstituted alkyl group or a substituted or unsubstituted aryl group; $R_3$ and $R_4$ represent hydrogen atom, a substituted or unsubstituted alkyl group or a substituted or unsubstituted aryl group; n and m respectively represents an integer of 0 to 5; x and y respectively represents an integer of 0 to 2; and $R_1$, $R_2$, X and Y may be the same or different from each other if n, m, x and y are 2 or more.

(10)

(19)

(20)

wherein $R_1$, $R_2$, X and Y represent hydrogen atom, a halogen atom, a substituted or unsubstituted alkyl group or a substituted or unsubstituted aryl group; $R_3$ and $R_4$ represent hydrogen atom, a substituted or unsubstituted alkyl group or a substituted or unsubstituted aryl group; n and m respectively represents an integer of 0 to 5; x and y respectively represents an integer of 0 to 2; and $R_1$, $R_2$, X and Y may be the same or different from each other if n, m, x and y are 2 or more.

As for the fluorine-based liquid crystal materials to be suitably employed in this invention, the following various liquid crystal compounds represented by the general formulas (11) to (20) can be employed.

(11)

(12)

(13)

(14)

(15)

(16)

(17)

(18)

wherein R' represents alkyl group, alkoxy group, alkylphenyl group, alkoxyalkylphenyl group, alkoxyphenyl group, alkylcyclohexyl group, alkoxyalkylcyclohexyl group, alkylcyclohexylphenyl group, halogen atom, alkylphenylalkyl group, alkoxyalkylphenylalkyl group, alkoxyalkylcyclohexylalkyl group, alkylcyclohexylalkyl group, alkoxyalkoxycyclohexylalkyl group, alkoxyphenylalkyl group or alkylcyclohexylphenylalkyl group; X represents fluorine atom, fluoromethyl group, difluoromethyl group, trifluoromethyl group, fluoromethoxy group, difluoromethoxy group or trifluoromethoxy group; Y represents hydrogen atom or a halogen atom; the aforementioned alkyl and alkoxy chains may contain an optical active center; and the phenyl or phenoxy group in R' and the phenyl group in these general formulas may be replaced by one or two halogen atoms such as fluorine atom or chlorine atom.

Although the dielectric anisotropy of all of aforementioned liquid crystal compounds is positive, these liquid crystal compounds may be mixed with a known liquid crystal exhibiting a negative dielectric anisotropy as long as the resultant mixed liquid crystal exhibits a positive dielectric anisotropy. Furthermore, even a liquid crystal exhibiting a negative dielectric anisotropy may be employed as it is, if it is formed into an appropriate element structure and an appropriate drive mode.

The ratio of the dichroic dye to the GH liquid crystal in the liquid crystal display element of this invention should preferably be 0.01 to 10% by weight, more preferably 0.05 to 5% by weight. If the ratio of the dichroic dye is less than 0.01% by weight, it would be impossible to sufficiently improve the display contrast. On the other hand, if the ratio of the dichroic dye exceeds over 10% by weight, a color may be left remained even at the moment when a voltage is impressed, thereby deteriorating the display contrast.

It is preferable in the liquid crystal display element of this invention to employ a fluorine-based liquid crystal as a host liquid crystal and also to employ an anthraquinone-based dichroic dye having at least two arylthio groups as a guest dichroic dye. If the liquid crystal display element is constructed in this manner, it is possible to optimize the color tone and contrast of the display, i.e. the effects of this invention can be exhibited in particular.

Furthermore, it is possible in the liquid crystal display element of this invention to add a fluorescence dye in the GH liquid crystal for the purpose of enhancing the whiteness of reflection light or for effecting it as an ultraviolet absorbent.

The liquid crystal display element according to this invention will be further explained with reference to the drawings.

Figure 1A:
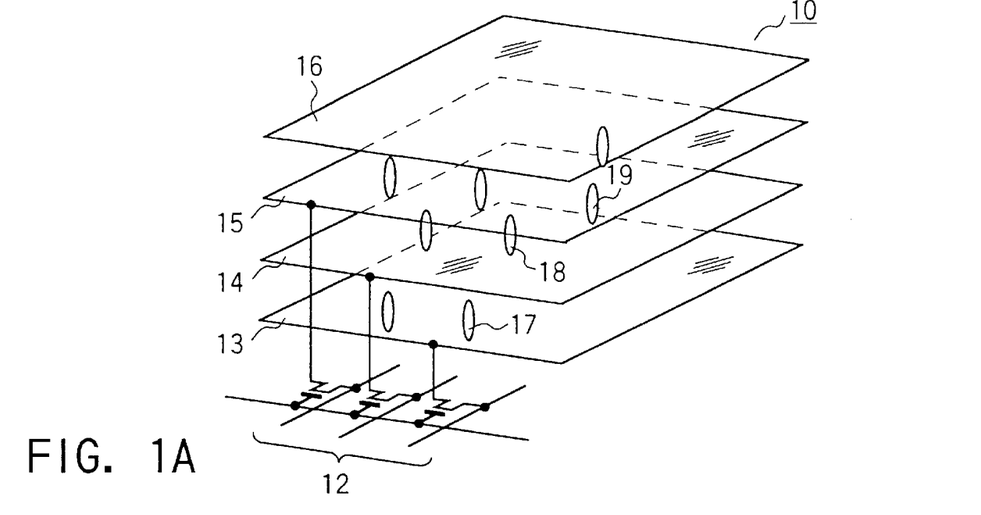
FIG. 1A is a perspective view schematically showing a liquid crystal display element according to this invention.
Figure 1B:
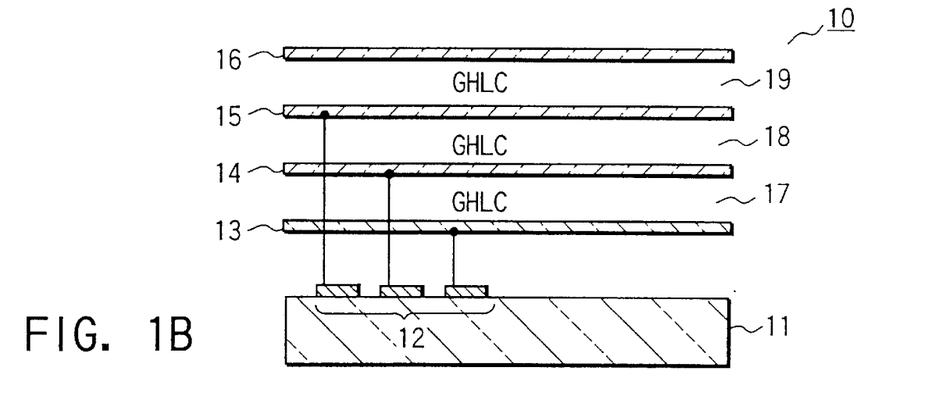
FIG. 1B is a side view schematically showing a liquid crystal display element according to this invention.

FIGS. 1A and 1B schematically show a perspective view and a side view of the liquid crystal display element according to a first embodiment this invention. Referring to FIGS. 1A and 1B, a substrate formed of glass for instance is referred by the number 11. A plurality of TFT 12 are formed on the substrate 11. Additionally, a pixel electrode 13 formed of aluminum for instance is formed via an insulating film on the substrate 11. Transparent electrodes 14, 15 and 16 each spaced apart from each other are laminated on the pixel electrode 13. GH liquid crystal layers 17, 18 and 19 each different in absorption wavelength from each other are interposed and held respectively between the aforementioned transparent electrodes, thus forming a liquid crystal display element 10. In this liquid crystal display element 10, the pixel electrode 13 functions also as a reflection plate.

Generally, a substrate formed of glass for instance is disposed on each of the GH liquid crystal layers 17, 18 and 19 in this liquid crystal display element 10. However, if GH liquid crystal microcapsules where the GH liquid crystal is covered with a transparent polymer film are employed for these GH liquid crystal layers 17, 18 and 19, such a substrate can be dispensed with. Namely, only the electrodes 14, 15 and 16 are required to be disposed on the surfaces of GH liquid crystal layers 17, 18 and 19, respectively, and the aforementioned substrate formed of glass, etc. is not required to be disposed on the surfaces of GH liquid crystal layers. By the way, instead of disposing a glass substrate on the GH liquid crystal layer, a transparent polymer film may be disposed on the GH liquid crystal layer.

When the display element is constructed without disposing a substrate formed of glass, etc. on each of GH liquid crystal layers 17, 18 and 19 by encapsulating the GH liquid crystal, the color variation on the display can be minimized. Moreover, when such a GH liquid crystal micro capsule is employed, the liquid crystal material can be formulated into an ink-like material. Therefore, if ink-like liquid crystal is employed, each of the liquid crystal layers can be easily formed by means of a printing method such as a patterning printing.

According to the above embodiment, the liquid crystal display element 10 is constructed by a laminated structure of the GH liquid crystal layers 17, 18 and 19 each differing in absorption wavelength. However, these liquid crystal layers differing in absorption wavelength from each other may be juxtaposed in the liquid crystal display element of this invention.

Figure 2:
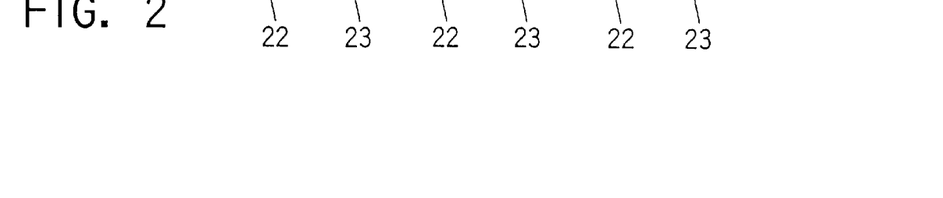
FIG. 2 is a cross-sectional view schematically showing a liquid crystal display element according to this invention.

FIG. 2 illustrates a cross-sectional view of the liquid crystal display element according to a second embodiment of this invention. Referring to FIG. 2, a substrate formed of glass for instance is referred by the number 21. A plurality of TFT 22 are formed on the substrate 21. Additionally, a pixel electrode 23 formed of aluminum for instance is formed via an insulating film on the substrate 21. GH liquid crystal layers 27, 28 and 29 each different in absorption wavelength from each other are horizontally juxtaposed on the pixel electrode 23. A transparent electrode 25 is disposed on these liquid crystal layers, thus forming a liquid crystal display element 20.

Since the liquid crystal display element employing a liquid crystal micro capsule is generally suffered from a scattering of light by the transparent polymer film constituting the micro capsule, an enhancement of contrast is strongly demanded for the liquid crystal display of this type.

Whereas, according to the liquid crystal display element of this invention, a mixture comprising a fluorine-based liquid crystal and an anthraquinone-based dichroic dye having at least two arylthio groups is employed for the GH liquid crystal layer, thus making it possible to obtain a display of high contrast.

As for the method of manufacturing GH liquid crystal micro capsule, any conventional method that has been employed for microcapsulation, such as a phase separation method, a submerged drying method, an interfacial polymerization method, an in situ polymerization method, a submerged film-forming method or a spray-drying method may be employed.

The material for the transparent polymer film may be selected from polyethylene; chlorinated polyethylene; ethylene copolymer such as ethylene-vinyl acetate copolymer, ethylene/acrylic acid/maleic anhydride copolymer; polybutadiene; polyester such as polyethylene terephthalate, polybutylene terephthalate, polyethylene naphthalate; polypropylene; polyisobutylene; polyvinyl chloride; natural rubber; polyvinylidene chloride; polyvinyl acetate; polyvinyl alcohol; polyvinyl acetal; polyvinyl butyral; fluoroplastics such as ethylene tetrafluoride, ethylene trifluoride, ethylene fluoride/propylene resin, vinylidene fluoride resin, vinyl fluoride resin, ethylene tetrafluoride/ perfluoroalkoxyethylene copolymer, ethylene tetrafluoride/ perfluoroalkylvinyl ether copolymer, ethylene tetrafluoride/ propylene hexafluoride copolymer, ethylene tetrafluoride/ ethylene copolymer and fluorine-containing polybenzooxazole; acrylic resin; methacrylic resin; acrylonitrile copolymer such as polyacrylonitrile, acrylonitrile/ butadiene/styrene copolymer; polystyrene; styrene/ acrylonitrile copolymer; acetal resin; polyamide such as nylon 66; polycarbonate; polyester carbonate; cellulose resin; phenol resin; urea resin; epoxy resin; unsaturated polyester resin; alkyd resin; melamine resin; polyurethane; diaryl phthalate; polyphenylene oxide; polyphenylene sulfide; polysulfone; polyphenylsulfone; silicone resin; polyimide; bismaleimide triazine resin; polyimidoamide; polyether imide; polyvinylcarbazole; norbornene-based polyolefin; cellulose; etc. Namely almost all kinds of polymer materials can be employed.

The aforementioned GH liquid crystal micro capsule is generally formed to have a particle diameter of 5 to 10 μm.

This invention will be further explained with reference to the following examples and comparative examples. However, this invention is not limited to these examples.

Followings are general formulas (21) to (27) of the dichroic dyes to be employed in the following examples and comparative examples.

(21)

wherein $R_1$ and $R_2$ are ethyl or t-butyl.

(22)

wherein $R_1$, $R_2$ and $R_3$ are ethyl or t-butyl.

(23)

wherein $R_1$ and $R_2$ are ethyl or t-butyl.

(24)

wherein $R_1$, $R_2$, $R_3$ and $R_4$ are ethyl or t-butyl.

(25)

wherein $R_1$ and $R_2$ are ethyl or t-butyl.

(26)

wherein $R_1$ and $R_2$ are hydrogen atom or t-butyl.

(27)

wherein $R_1$, $R_2$, $R_3$ and $R_4$ are hydrogen atom, chlorine atom or isobutyl.

EXAMPLE 1

1% by weight of an anthraquinone-based dichroic dye represented by the general formula (21) was dissolved in a fluorine-based liquid crystal LIXON 5065xx (trade name: a product from Chisso Kagaku Kogyo Co.) to prepare a GH liquid crystal. The peak wavelength and half band width of this GH liquid crystal are shown in the table shown below.

Meanwhile, polyimide-based resin was coated on a glass plate attached with transparent electrodes and then cured. Then, the coated layer was subjected to a rubbing treatment so as to align the liquid crystal molecules in parallel to the face of the glass plate, thus obtaining a substrate. A couple of the substrates thus obtained were disposed parallel, thus forming a cell having a gap of 9 μm. Then, the aforementioned GH liquid crystal was put and sealed in the cell. A couple of cells thus obtained were superimposed on a reflection plate in such a manner that the alignment directions these cells intersect at right angles, thereby preparing a yellow reflective type GH liquid crystal element.

When the contrast ratio "R" based on the quantity of transmitted light was measured for this GH liquid crystal element, the contrast ratio "R" was found as being 6.5 under the conditions of 50 Hz in AC current and 10V in voltage applied.

COMPARATIVE EXAMPLE 1

The same procedures as illustrated in Example 1 were repeated except that a cyano-based liquid crystal LIXON 4033-000xx (trade name: a product from Chisso Kagaku Kogyo Co.) was substituted for the fluorine-based liquid crystal, thereby to prepare a yellow GH liquid crystal display element. The peak wavelength and half band width of this GH liquid crystal are shown in the table shown below. As clearly seen from the table, the half band width of this GH liquid crystal was narrower than that of the GH liquid crystal employed in Example 1.

When the contrast ratio "RR" based on the quantity of transmitted light was measured for this GH liquid crystal element, the contrast ratio "R" was found as being 6.0 under the conditions of 50 Hz in AC current and 10V in voltage applied, i.e. the contrast ratio obtained in this Comparative Example was smaller than that obtained in Example 1.

EXAMPLE 2

1% by weight of an anthraquinone-based dichroic dye represented by the general formula (22) was dissolved in a fluorine-based liquid crystal LIXON 5052xx (trade name: a product from Chisso Kagaku Kogyo Co.) to prepare a GH liquid crystal. The peak wavelength and half band width of this GH liquid crystal are shown in the table shown below.

Meanwhile, polyimide-based resin was coated on a glass plate attached with transparent electrodes and then cured. Then, the coated layer was subjected to a rubbing treatment so as to align the liquid crystals in parallel with each other, thus obtaining a substrate. A couple of the substrates thus obtained were disposed parallel, thus forming a cell having a gap of 9 $\mu$m. Then, the aforementioned GH liquid crystal was put and sealed in the cell. A couple of cells thus obtained were superimposed on a reflection plate in such a manner that the alignment directions these cells intersect at right angles, thereby preparing a magenta reflective type GH liquid crystal element.

When the contrast ratio "R" based on the quantity of transmitted light was measured for this GH liquid crystal element, the contrast ratio "R" was found as being 6.4 under the conditions of 50 Hz in AC current and 10V in voltage applied.

COMPARATIVE EXAMPLE 2

The same procedures as illustrated in Example 2 were repeated except that a cyano-based liquid crystal LIXON 4031-000xx (trade name: a product from Chisso Kagaku Kogyo Co.) was substituted for the fluorine-based liquid crystal, thereby to prepare a magenta GH liquid crystal display element. The peak wavelength and half band width of this GH liquid crystal are shown in the table shown below. As clearly seen from the table, the half band width of this GH liquid crystal was narrower than that of the GH liquid crystal employed in Example 2.

When the contrast ratio "R" based on the quantity of transmitted light was measured for this GH liquid crystal element, the contrast ratio "R" was found as being 5.9 under the conditions of 50 Hz in AC current and 10V in voltage applied, i.e. the contrast ratio obtained in this Comparative Example was smaller than that obtained in Example 2.

EXAMPLE 3

1% by weight of an anthraquinone-based dichroic dye represented by the general formula (23) was dissolved in a fluorine-based liquid crystal LIXON 5065xx (trade name: a product from Chisso Kagaku Kogyo Co.) to prepare a GH liquid crystal. The peak wavelength and half band width of this GH liquid crystal are shown in the table shown below.

Meanwhile, polyimide-based resin was coated on a glass plate attached with transparent electrodes and then cured. Then, the coated layer was subjected to a rubbing treatment so as to align the liquid crystals in parallel with each other, thus obtaining a substrate. A couple of the substrates thus obtained were disposed parallel, thus forming a cell having a gap of 9 $\mu$m.

Then, the aforementioned GH liquid crystal was put and sealed in the cell. A couple of cells thus obtained were superimposed on a reflection plate in such a manner that the alignment directions these cells intersect at right angles, thereby preparing a magenta reflective type GH liquid crystal element.

When the contrast ratio "R" based on the quantity of transmitted light was measured for this GH liquid crystal element, the contrast ratio "R" was found as being 6.2 under the conditions of 50 Hz in AC current and 10V in voltage applied.

COMPARATIVE EXAMPLE 3

The same procedures as illustrated in Example 3 were repeated except that a cyano-based liquid crystal LIXON 4033-000xx (trade name: a product from Chisso Kagaku Kogyo Co.) was substituted for the fluorine-based liquid crystals thereby to prepare a magenta GH liquid crystal display element. The peak wavelength and half band width of this GH liquid crystal are shown in the table shown below. As clearly seen from the table, the half band width of this GH liquid crystal was narrower than that of the GH liquid crystal employed in Example 3.

When the contrast ratio "R" based on the quantity of transmitted light was measured for this GH liquid crystal element, the contrast ratio "R" was found as being 5.8 under the conditions of 50 Hz in AC current and 10V in voltage applied, i.e. the contrast ratio obtained in this Comparative Example was smaller than that obtained in Example 3.

EXAMPLE 4

1% by weight of an anthraquinone-based dichroic dye represented by the general formula (24) was dissolved in a fluorine-based liquid crystal LIXON 5065xx (trade name: a product from Chisso Kagaku Kogyo Co.) to prepare a GH liquid crystal. The peak wavelength and half band width of this GH liquid crystal are shown in the table shown below.

Meanwhile, polyimide-based resin was coated on a glass plate attached with transparent electrodes and then cured. Then, the coated layer was subjected to a rubbing treatment so as to align the liquid crystals in parallel with each other, thus obtaining a substrate. A couple of the substrates thus obtained were disposed parallel, thus forming a cell having a gap of 9 $\mu$m. Then, the aforementioned GH liquid crystal was put and sealed in the cell. A couple of cells thus obtained were superimposed on a reflection plate in such a manner that the alignment directions these cells intersect at right angles, thereby preparing a cyan reflective type GH liquid crystal element.

When the contrast ratio "R" based on the quantity of transmitted light was measured for this GH liquid crystal element, the contrast ratio "R" was found as being 6.3 under the conditions of 50 Hz in AC current and 10V in voltage applied.

COMPARATIVE EXAMPLE 4

The same procedures as illustrated in Example 4 were repeated except that a cyano-based liquid crystal LIXON 4031-000xx (trade name: a product from Chisso Kagaku Kogyo Co.) was substituted for the fluorine-based liquid crystal, thereby to prepare a cyan GH liquid crystal display element. The peak wavelength and half band width of this GH liquid crystal are shown in the table shown below. As clearly seen from the table, the half band width of this GH liquid crystal was narrower than that of the GH liquid crystal employed in Example 4.

When the contrast ratio "R" based on the quantity of transmitted light was measured for this GH liquid crystal element, the contrast ratio "R" was found as being 6.0 under the conditions of 50 Hz in AC current and 10V in voltage applied, i.e. the contrast ratio obtained in this Comparative Example was smaller than that obtained in Example 4.

EXAMPLE 5

1% by weight of an anthraquinone-based dichroic dye represented by the general formula (25) was dissolved in a fluorine-based liquid crystal LIXON 5052xx (trade name: a product from Chisso Kagaku Kogyo Co.) to prepare a GH liquid crystal. The peak wavelength and half band width of this GH liquid crystal are shown in the table shown below.

Meanwhile, polyimide-based resin was coated on a glass plate attached with transparent electrodes and then cured. Then, the coated layer was subjected to a rubbing treatment so as to align the liquid crystals in parallel with each other, thus obtaining a substrate. A couple of the substrates thus obtained were disposed parallel, thus forming a cell having a gap of 9 $\mu$m. Then, the aforementioned GH liquid crystal was put and sealed in the cell. A couple of cells thus obtained were superimposed on a reflection plate in such a manner that the alignment directions these cells intersect at right angles, thereby preparing a cyan reflective type GH liquid crystal element.

When the contrast ratio "R" based on the quantity of transmitted light was measured for this GH liquid crystal element, the contrast ratio "R" was found as being 6.3 under the conditions of 50 Hz in AC current and 10V in voltage applied.

COMPARATIVE EXAMPLE 5

The same procedures as illustrated in Example 5 were repeated except that a cyano-based liquid crystal E7 (trade name: a product from Merk Co.) was substituted for the fluorine-based liquid crystal, thereby to prepare a cyan GH liquid crystal display element. The peak wavelength and half band width of this GH liquid crystal are shown in the table shown below. As clearly seen from the table, the half band width of this GH liquid crystal was narrower than that of the GH liquid crystal employed in Example 5.

When the contrast ratio "R" based on the quantity of transmitted light was measured for this GH liquid crystal element, the contrast ratio "R" was found as being 5.7 under the conditions of 50 Hz in AC current and 10V in voltage applied, i.e. the contrast ratio obtained in this Comparative Example was smaller than that obtained in Example 5.

EXAMPLE 6

1% by weight of an anthraquinone-based dichroic dye represented by the general formula (26) was dissolved in a fluorine-based liquid crystal LIXON 5052xx (trade name: a product from Chisso Kagaku Kogyo Co.) to prepare a GH liquid crystal. The peak wavelength and half band width of this GH liquid crystal are shown in the table shown below.

Meanwhile, polyimide-based resin was coated on a glass plate attached with transparent electrodes and then cured. Then, the coated layer was subjected to a rubbing treatment so as to align the liquid crystals in parallel with each other, thus obtaining a substrate. A couple of the substrates thus obtained were disposed parallel, thus forming a cell having a gap of 9 $\mu$m. Then, the aforementioned GH liquid crystal was put and sealed in the cell. A couple of cells thus obtained were superimposed on a reflection plate in such a manner that the alignment directions these cells intersect at right angles, thereby preparing a magenta reflective type GH liquid crystal element.

When the contrast ratio "R" based on the quantity of transmitted light was measured for this GH liquid crystal element, the contrast ratio "R" was found as being 6.7 under the conditions of 50 Hz in AC current and 10V in voltage applied.

COMPARATIVE EXAMPLE 6

The same procedures as illustrated in Example 6 were repeated except that a cyano-based liquid crystal E7 (trade name: a product from Merk Co.) was substituted for the fluorine-based liquid crystal, thereby to prepare a magenta GH liquid crystal display element. When the contrast ratio "R" based on the quantity of transmitted light was measured for this GH liquid crystal element, the contrast ratio "R" was found as being 5.8 under the conditions of 50 Hz in AC current and 10V in voltage applied, i.e. the contrast ratio obtained in this Comparative Example was smaller than that obtained in Example 6.

EXAMPLE 7

1% by weight of an anthraquinone-based dichroic dye represented by the general formula (27) was dissolved in a fluorine-based liquid crystal LIXON 5052xx (trade name: a product from Chisso Kagaku Kogyo Co.) to prepare a GH liquid crystal. The peak wavelength and half band width of this GH liquid crystal are shown in the table shown below.

Meanwhile, polyimide-based resin was coated on a glass plate attached with transparent electrodes and then cured. Then, the coated layer was subjected to a rubbing treatment so as to align the liquid crystals in parallel with each other, thus obtaining a substrate.

A couple of the substrates thus obtained were disposed parallel, thus forming a cell having a gap of 9 $\mu$m.

Then, the aforementioned GH liquid crystal was put and sealed in the cell. A couple of cells thus obtained were superimposed on a reflection plate in such a manner that the alignment directions these cells intersect at right angles, thereby preparing a cyan reflective type GH liquid crystal element.

When the contrast ratio "R" based on the quantity of transmitted light was measured for this GH liquid crystal element, the contrast ratio "R" was found as being 6.4 under the conditions of 50 Hz in AC current and 10V in voltage applied.

COMPARATIVE EXAMPLE 7

The same procedures as illustrated in Example 7 were repeated except that a cyano-based liquid crystal E7 (trade name: a product from Merk Co.) was substituted for the fluorine-based liquid crystal, thereby to prepare a magenta GH liquid crystal display element. When the contrast ratio "R" based on the quantity of transmitted light was measured for this GH liquid crystal element, the contrast ratio "R" was found as being 5.5 under the conditions of 50 Hz in AC current and 10V in voltage applied, i.e. the contrast ratio obtained in this Comparative Example was smaller than that obtained in Example 7.

TABLE

| Dye | In fluorine-based liquid crystal | | Cyano-based liquid crystal | |
| --- | --- | --- | --- | --- |
| | Half band width (nm) | Peak wavelength (nm) | Half band width (nm) | Peak wavelength (nm) |
| (21) | 87  | 463, 445 | 78  | 460, 450 |
| (22) | 76  | 552, 519 | 72  | 556, 522 |
| (23) | 95  | 570, 536 | 82  | 573, 537 |
| (24) | 126 | 684, 640 | 120 | 688, 635 |
| (25) | 128 | 685, 638 | 121 | 685, 634 |
| (26) | 96  | 580, 545 | 81  | 580, 546 |
| (27) | 125 | 690, 645 | 120 | 692, 645 |

As shown in the above table, in any kinds of dye employed in these examples, a larger half band width was obtained when a fluorine-based liquid crystal was employed as compared with that when a cyano-based liquid crystal was employed. When the display performance of these elements was compared with each other by means of visual observation, it was found that a more excellent deep color tone could be obtained irrespective of the kinds of dye when a fluorine-based liquid crystal was employed. With regard to the display contrast, the contrast was found extremely improved in the liquid crystal display element where a magenta or cyan dye was employed. In particular, most prominent improvement in contrast was recognized when a magenta dye was employed.

Therefore, it has been confirmed that when a fluorine-based liquid crystal is employed as a host liquid crystal and at the same time when an anthraquinone-based dichroic dye having at least two arylthio groups is employed as a guest dichroic dye in the GH liquid crystal display element designed to display a full color, it is possible to concurrently realize an excellent color tone and a high display contrast.

The following Examples 8 and 9 illustrate other different embodiments of a full color type GH liquid display element.

EXAMPLE 8

The liquid crystal display element shown in FIGS. 1A and 1B was prepared by the following method.

First of all, 1% by weight of a yellow anthraquinone-based dichroic dye represented by the general formula (21) was dissolved in a fluorine-based liquid crystal LIXON 5053xx (trade name: a product from Chisso Kagaku Kogyo Co.) to prepare a GH liquid crystal. The half band width in absorption spectrum of this GH liquid crystal was 88 nm.

80 parts by weight of this GH liquid crystal, 15 parts by weight of fluorinated methacrylate monomer and 0.2 part by weight of benzoyl peroxide were mixed and dissolved. Then, a mixture comprising 300 parts by weight of pure water and 3 parts by weight of a surfactant was stirred at a rotational speed of 1,000 rpm and a temperature of 65° C., into which the aforementioned GH liquid crystal was dripped to polymerize the monomer. After the polymerization was continued for one hour, the product was filtered using a filter having a mesh size of 1 μm thereby to remove fine liquid crystal capsules. Subsequently, the polymerized product was washed with pure water three times and then dried to obtain a GH liquid crystal micro capsule enclosed by a transparent polymer film having a particle size of 4 to 6 μm.

Then, the GH liquid crystal micro capsule obtained was mixed with 8 parts by weight of epoxy prepolymer (Epicoat), and the resultant mixture was allowed to drip into 200 parts by weight of a 5 wt % aqueous solution of gelatin while continuing the stirring of the solution so as to form microdroplets. At the same time, 3 parts by weight of an amine-based curing agent was dissolved in 50 parts by weight of water to prepare a solution, which was then gradually dripped into the former solution over one hour at a temperature of 40° C. while continuing the stirring of the solution.

Subsequently, the resultant solution was filtered using a filter having a mesh size of 1 μm thereby to remove fine liquid crystal capsules. Subsequently, the resultant product was washed with pure water three times and then dried to obtain a yellow GH liquid crystal micro capsule enclosed by a 2-ply transparent polymer film comprising a fluorine-based methacrylate film and an epoxy resin film, the particle diameter of the GH liquid crystal micro capsule being 5 to 7 μm.

Then, the same procedures as illustrated above were repeated except that a magenta anthraquinone-based dichroic dye represented by the general formula (22) was substituted for the yellow anthraquinone-based dichroic dye represented by the general formula (21), thereby to obtain a magenta GH liquid crystal micro capsule enclosed by a 2-ply transparent polymer film comprising a fluorine-based methacrylate film and an epoxy resin film, the particle diameter of the GH liquid crystal micro capsule being 5 to 7 μm.

Likewise, the same procedures as illustrated above were repeated except that a cyan anthraquinone-based dichroic dye represented by the general formula (24) was substituted for the yellow anthraquinone-based dichroic dye represented by the general formula (21), thereby to obtain a cyan GH liquid crystal micro capsule enclosed by a 2-ply transparent polymer film comprising a fluorine-based methacrylate film and an epoxy resin film, the particle diameter of the GH liquid crystal micro capsule being 5 to 7 μm.

Then, the liquid crystal display element as shown in FIG. 1 was prepared by making use of these yellow, magenta and cyan GH liquid crystal microcapsules obtained as mentioned above.

Namely, the liquid crystal layers 17 to 19 were formed by making use of these GH liquid crystal microcapsules which were manufactured as mentioned above by encapsulating the guest/host liquid crystals containing dye molecules of yellow, magenta or cyan with a transparent polymer film. Specifically, each of these GH liquid crystal microcapsules was dispersed in a 10% aqueous solution of isopropyl alcohol to obtain a 10% solution of the GH liquid crystal micro capsule, which was then coated on the pixel electrode 13. After being dried, the GH liquid crystal micro capsule was pressed with a teflon plate and heated for two hours at a temperature of 120° C. thereby contacting the GH liquid crystal micro capsule onto the pixel electrode 13 while allowing the GH liquid crystal micro capsule to be cured. Subsequently, the GH liquid crystal micro capsule was cooled down to room temperature and then the teflon plate was removed.

The transparent electrode layers 14 and 15 were formed by the steps of sputtering a transparent conductive material, and patterning the layer of this conductive material by means of photolithography and etching; or by the step of pattern-printing a dispersed solution of the transparent conductive material. By the way, there is no restriction regarding the laminating order of the liquid crystal layers 17 to 19.

A glass plate or a polymer film each provided with a transparent counter electrode 16 was disposed on the surface of the cyan-based liquid crystal layer 19. Each of the TFTs is electrically connected with the pixel electrode 13 and with the transparent electrodes 14 and 15.

Figure 3A:
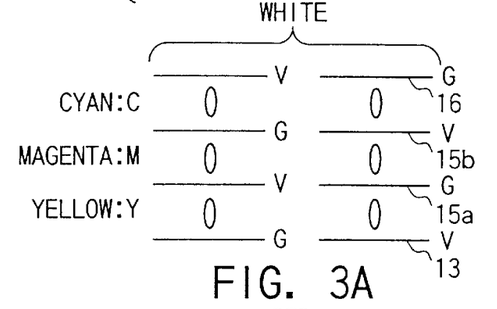
FIGS. 3A to 3H respectively shows a state driven of a liquid crystal display element according to this invention.
Figure 3B:
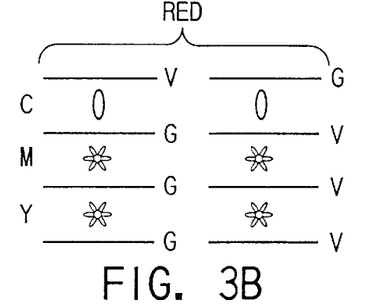
Figure 3C:
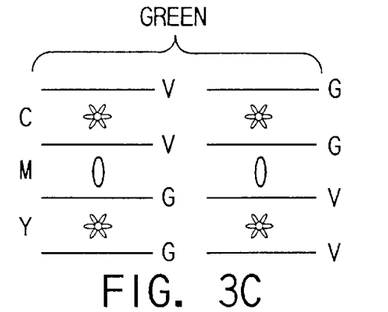
Figure 3D:
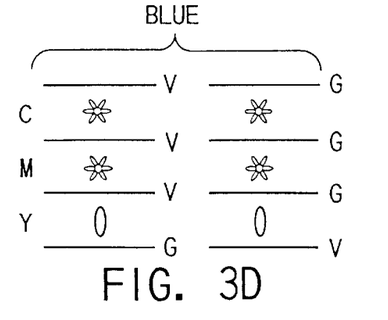
Figure 3E:
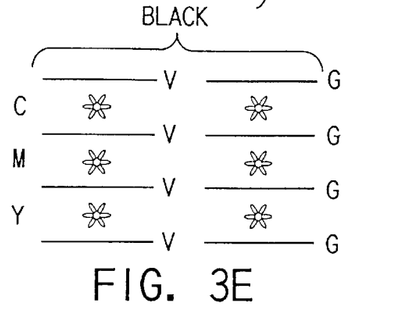
Figure 3F:
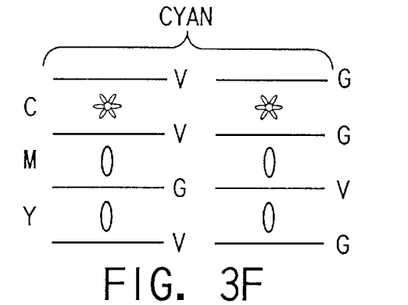
Figure 3G:
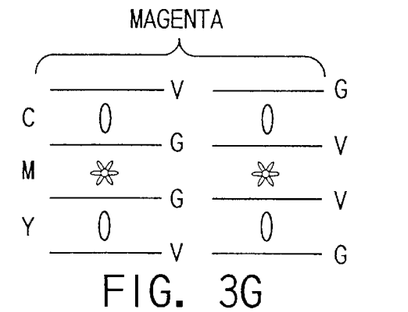
Figure 3H:
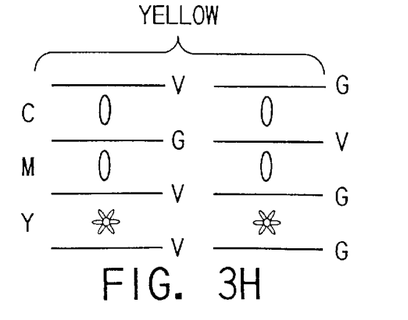

In the occasion of performing a color display by making use of this liquid crystal display element constructed in this manner, the voltage to be impressed on four electrodes holding therein each of liquid crystal layers is determined in advance by making use of arithmetic circuit. For example, when "white" is to be displayed, a voltage is impressed as shown in FIG. 3A, wherein G means GND or an electric potential constituting a standard, and V denotes an electric potential to the GND or an electric potential with which the light transmittance can be sustained in high degree. The reason for indicating the application of voltage in two ways is that an AC waveform may be required to be applied to the liquid crystal layer. In the case of the guest/host liquid crystal, the light is allowed to transmit therein if "white" is to be displayed, so that the liquid crystal molecules and the dye molecules are required to be erected as perpendicular as possible to the surface of the electrode, and hence a voltage is impressed as shown in FIG. 3A.

As for the other colors, they can be displayed by controlling the voltages between the liquid crystal layers as shown in FIGS. 3B to 3H.

When this liquid crystal display element was actuated with a voltage of 5V, the contrast ratio between white and black was found to be as high as 5.3 and the color tone was also excellent.

EXAMPLE 9

A liquid crystal display element as shown in FIG. 2 was manufactured by making use of the GH liquid crystal microcapsules prepared in Example 8. Specifically, each of these GH liquid crystal microcapsules was dispersed in a 10% aqueous solution of polyvinyl alcohol to obtain a 10% solution of the GH liquid crystal micro capsule, which was then pattern-printed on a glass substrate. After being dried, the GH liquid crystal micro capsule was pressed with a teflon plate and heated for two hours at a temperature of 120° C. thereby contacting the GH liquid crystal micro capsule onto the glass plate while allowing the GH liquid crystal micro capsule to be cured. Subsequently, the GH liquid crystal micro capsule was cooled down to room temperature and then the teflon plate was removed. Then, a polymer film 26 provided with a transparent electrode layer 25 was laminated on the pattern of GH liquid crystal layer.

When this liquid crystal display element was actuated with a voltage of 5V, the contrast ratio between white and black was found to be as high as 3.1 and the color tone was also excellent.

As explained above, since a fluorine-based liquid crystal containing an anthraquinone-based magenta or cyan dichroic dye having at least two arylthio groups is employed as a liquid crystal according to this invention, it is possible to provide a reflective type color liquid crystal display element, which is excellent in both display contrast ratio and color tone. Therefore, this liquid crystal display element is suited for use as a portable display of low power consumption, and is highly valuable in industrial viewpoint.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A liquid crystal display element which comprises; a substrate provided on one main surface thereof with an electrode;

three GH liquid crystal layers stacked or juxtaposed on said substrate, each GH liquid crystal layer being different in absorption wavelength from each other and containing a mixture of a host liquid crystal and 0.01–10% by weight of a guest dichroic dye; and three transparent electrode layers, each formed on each of said GH liquid crystal layers;

wherein one layer out of said three GH liquid crystal layers contains a mixture of a fluorine-based liquid crystal and an anthraquinone-based magenta or cyan dichroic dye having at least two arylthio groups, and has an absorption wavelength not less than 519 nm.

2. The liquid crystal display element according to claim 1, wherein said anthraquinone-based dichroic dye is an anthraquinone-based magenta dichroic dye.

3. The liquid crystal display element according to claim 1, wherein said host liquid crystal of each of said three GH liquid crystal layers is a fluorine-bused liquid crystal.

4. The liquid crystal display element according to claim 1, wherein said anthraquinone-based dichroic dye has at least two arylthio groups which are attached to the position 1, 4, 5 or 8 of said anthraquinone-based dichroic dye.

5. The liquid crystal display element according to claim 1, wherein said anthraquinone-based dichroic dye has at least two arylthio groups which are attached to the position 1, 4, 5 or 8 of said anthraquinone-based dichroic dye, and said positions that are left unsubstituted by said arylthio groups are attached with hydrogen atom, hydroxyl group, alkylamino group or arylamino group.

6. The liquid crystal display element according to claim 1, wherein said three GH liquid crystal layers are stacked on said substrate.

7. The liquid crystal display element according to claim 1, wherein said three GH liquid crystal layers are juxtaposed on said substrate.

8. The liquid crystal display element according to claim 1, wherein said mixture of the host liquid crystal and the guest dichroic dye contained in each of said liquid crystal layers is encapsulated to form GH liquid crystal microcapsules.

9. A liquid crystal display element, which comprises: a substrate provided on one main surface thereof with an electrode;

three GH liquid crystal layers stacked or juxtaposed on said substrate, each GH liquid crystal layer being different in absorption wavelength from each other and containing a mixture of a host liquid crystal and 0.01–10% by weight of a guest dichroic dye; and three transparent electrode layers, each formed on each of said GH liquid crystal layers;

wherein one layer out of said three GH liquid crystal layers contains a mixture of a fluorine-based liquid crystal and an anthraquinone-based magenta or cyan dichroic dye having at least two arylthio groups, and has an absorption wavelength not less than 519 nm; and wherein said host liquid crystal of each of said three GH liquid crystal layers is a fluorine-based liquid crystal; and wherein said dichroic dyes of remaining two of said three GH liquid crystal layers contain anthraquinone-based magenta, cyan or yellow dichroic dyes having at least two arylthio groups, respectively.

10. A liquid crystal display element which comprises;

a substrate provided on one main surface thereof with an electrode;

three GH liquid crystal layers stacked or juxtaposed on said substrate, each GH liquid crystal layer being different in absorption wavelength from each other and containing a mixture of a host liquid crystal and 0.01–10% by weight of a guest dichroic dye; and three transparent electrode layers, each formed on each of said GH liquid crystal layers;

wherein one layer out of said three OH liquid crystal layers contains a mixture of a fluorine-based liquid crystal and a magenta or cyan dichroic dye selected from the group consisting of a dichroic dye having an anthraquinone skeleton and four arylthio groups attached to the position 1, 4, 5 and 8 of the anthraquinone skeleton, a dichroic dye having an anthraquinone skeleton, two arylthio groups and two hydroxyl groups attached to the position 1, 4, 5 and 8 of the anthraquinone skeleton, and a dichroic dye having an anthraquinone skeleton, two arylthio groups and two alkylamino or arylamino groups attached to the position 1, 4, 5 and 8 of the anthraquinone skeleton.

11. The liquid crystal display element according to claim 10, wherein said magenta or cyan dichroic dye is a magenta dichroic dye having an anthraquinone skeleton and four arylthio groups attached to the position 1, 4, 5 and 8 of the anthraquinone skeleton.

12. The liquid crystal display element according to claim 10, wherein said magenta Dr cyan dichroic dye is a magenta dichroic dye having an anthraquinone skeleton, two arylthio groups and two hydroxyl groups attached to the position 1, 4, 5 and 8 of the anthraquinone skeleton.

13. The liquid crystal display element according to claim 10, wherein said host liquid crystal of each of said three GH liquid crystal layers is a fluorine-based liquid crystal.

14. The liquid crystal display element according to claim 10, wherein said three GH liquid crystal layers are stacked on said substrate.

15. The liquid crystal display element according to claim 10, wherein said three GH liquid crystal layers are juxtaposed on said substrate.

16. The liquid crystal display element according to claim 10, wherein said mixture of the host liquid crystal and the guest dichroic dye contained in each of said liquid crystal layers is encapsulated to form GH liquid crystal microcapsules.

17. A liquid crystal display element, which comprises:

a substrate provided on one main surface thereof with an electrode;

three GH liquid crystal layers stacked or juxtaposed on said substrate, each GH liquid crystal layer being different in absorption wavelength from each other and containing a mixture of a host liquid crystal and 0.01–10% by weight of a guest dichroic dye; and three transparent electrode layers, each formed on each of said GH liquid crystal layers;

wherein one layer out of said three GH liquid crystal layers contains a mixture of a fluorine-based liquid crystal and a magenta or cyan dichroic dye selected from the group consisting of a dichroic dye having an anthraquinone skeleton and four arylthio groups attached to the position 1, 4, 5 and 8 of the anthraquinone skeleton, a dichroic dye having an anthraquinone skeleton, two arylthio groups and two hydroxyl groups attached to the position 1, 4, 5 and 8 of the anthraquinone skeleton, and a dichroic dye having an anthraquinone skeleton, two arylthio groups and two alkylamino or arylamino groups attached to the position 1, 4, 5 and 8 of the anthraquinone skeleton; and wherein said dichroic dyes of remaining two of said three GH liquid crystal layers contain anthraquinone-based magenta, cyan or yellow dichroic dyes having at least two arylthio groups, respectively.

* * * * *

UNITED STATES PATENT AND TRADEMARK OFFICE
CERTIFICATE OF CORRECTION

PATENT NO.   : 5,958,291
DATED        : September 28, 1999
INVENTOR(S)  : Katsuyuki Naito et al.

It is certified that error appears in the above-identified patent and that said Letters Patent is hereby corrected as shown below:

Column 23,
Line 10, "OH" should read -- GH --.
Line 32, "Dr" should read -- or --.

Signed and Sealed this

Thirtieth Day of July, 2002

Attest:

JAMES E. ROGAN
Attesting Officer    Director of the United States Patent and Trademark Office